March 7, 1950  T. C. BENNETT ET AL  2,499,350
FLOATING WING AIRPLANE

Filed Jan. 17, 1945  4 Sheets-Sheet 1

Inventors
Theodore C. Bennett,
Mark Morton and
Frederick M. Gloeckler.

By

Attorney

March 7, 1950     T. C. BENNETT ET AL     2,499,350
FLOATING WING AIRPLANE

Filed Jan. 17, 1945     4 Sheets-Sheet 4

Inventors
Theodore C. Bennett,
Mark Morton and
Frederick M. Gloeckler.

By
Attorney

Patented Mar. 7, 1950

2,499,350

UNITED STATES PATENT OFFICE 2,499,350

FLOATING WING AIRPLANE

Theodore C. Bennett, Morton, Mark Morton, Philadelphia, and Frederick M. Gloeckler, Upper Darby, Pa.

Application January 17, 1945, Serial No. 573,232

10 Claims. (Cl. 244—101)

(Granted under the act of March 3, 1883, as amended April 30, 1928; 370 O. G. 757)

This invention relates to a floating wing airplane and has for an object to provide an improved floating wing airplane which may be either in the form of a seaplane or an amphibian plane.

Another object of this invention is to provide a low wing sea or amphibian plane particularly characterized by a comparatively small frontal area and a low overall height.

Still another object of this invention is to provide a low wing seaplane in which no wing floats are necessary and which relies for its floatability both on its hull and on a part of its wing structure.

Still a further object of this invention is to provide a low wing seaplane wherein the propeller is protected from water or spray during take-off or landing.

Still a further object of this invention is to provide a low wing seaplane of the pusher type with the motor very close to the center of gravity and the propeller slightly aft of the center of gravity and counterbalanced by the location of the pilot and of the armament forward of the center of gravity.

Still another object of this invention is to provide a low wing seaplane with the pilot position sufficiently forward of the leading edge of the wing so that he has good visibility downwardly and somewhat rearwardly of the leading edge of the wing, and in an emergency if he has to abandon ship, he can drop from his location forward of the leading edge of the wing and thus be fully protected from the propeller or tail surfaces as he falls away from the plane.

Another object of this invention is to provide a low wing seaplane having a step in the hull through which step the exhaust from the engine may be directed after the engine has been warmed up to assist in the take-off through a jet propulsion effect as well as step ventilation assisting in breaking the skin tension of the water and during flight eliminating the aerodynamic discontinuity due to the step.

Still another object of this invention is to provide a pusher type of plane wherein cooling air is controllably fed to an engine compartment and thence controllably passed on to the propeller to increase its efficiency.

With the foregoing and other objects in view, the invention consists in the construction, combination and arrangement of parts hereinafter set forth, claimed and illustrated in the drawings in which:

Figure 1:
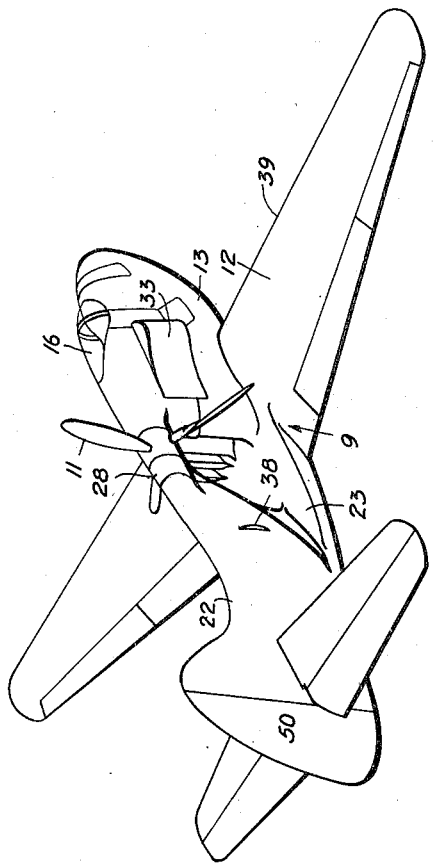
Fig. 1 is a perspective view of the floating wing airplane of this invention.
Figure 2:
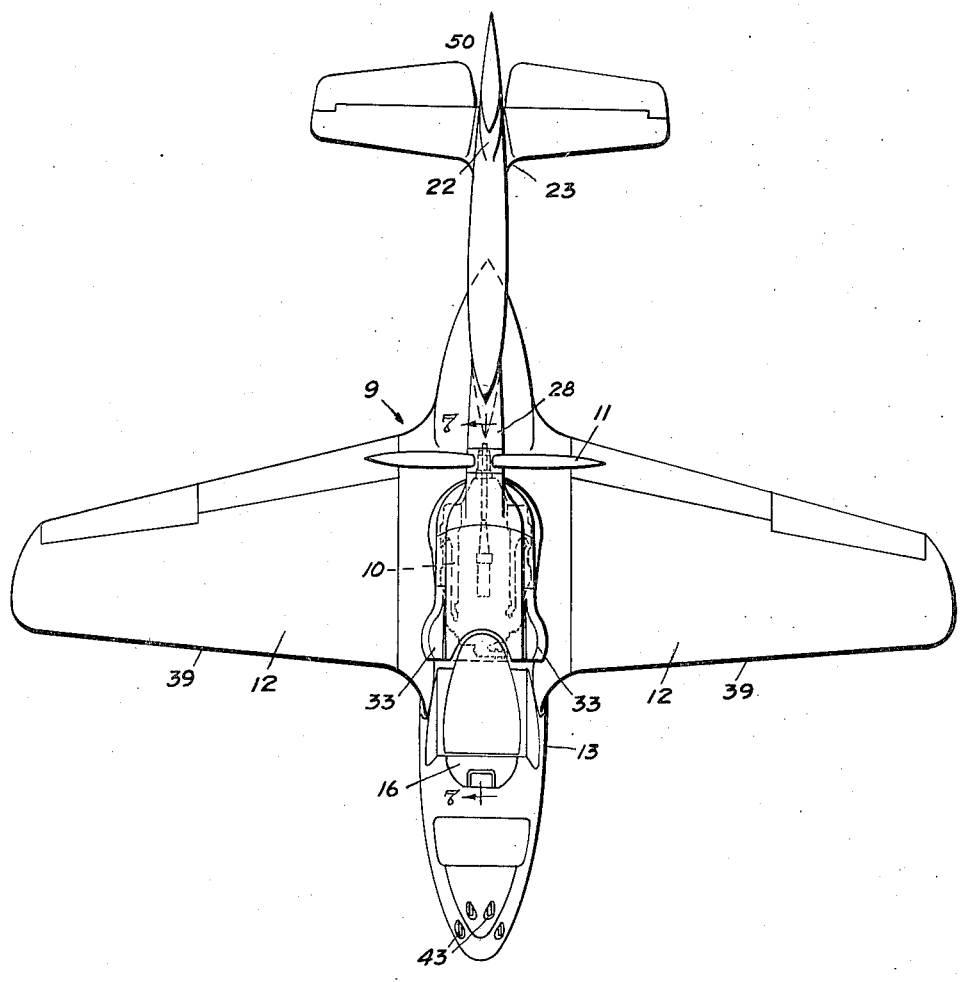
Fig. 2 is a top elevational view of Fig. 1.
Figure 3:
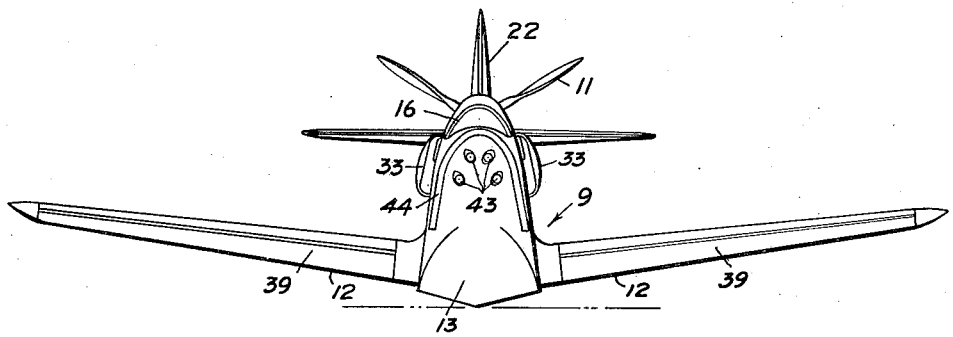
Fig. 3 is a front elevational view of Fig. 2.
Figure 4:
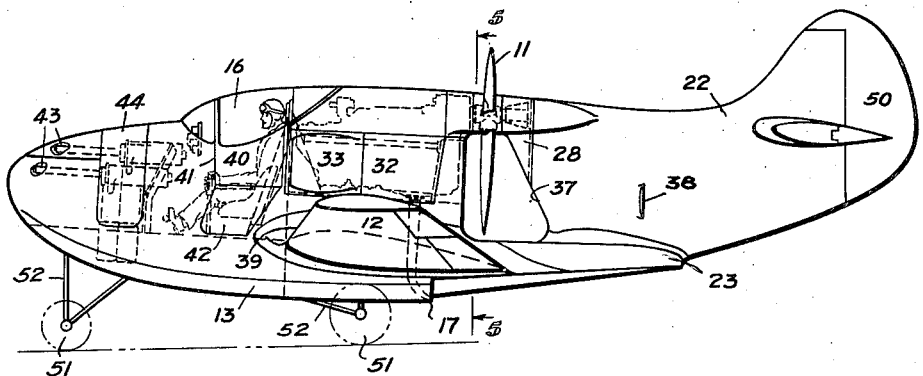
Fig. 4 is a side elevational view of Fig. 3.
Figure 5:
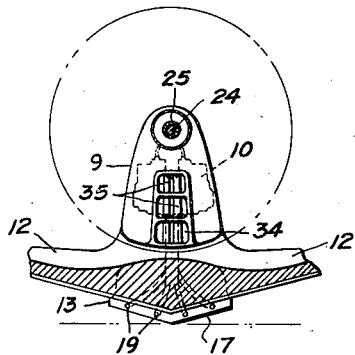
Fig. 5 is a sectional fragmentary view on line 5—5 of Fig. 4.
Figure 6:
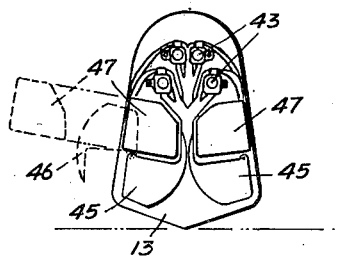
Fig. 6 is a fragmentary nose view showing the armament loading details.
Figure 8:
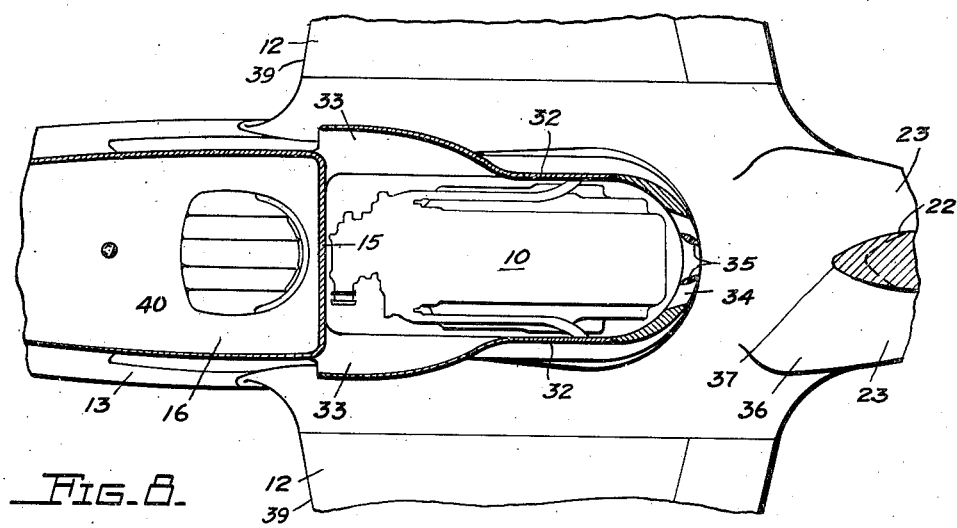
Fig. 8 is a fragmentary sectional view on line 8—8 of Fig. 7.
Figure 7:
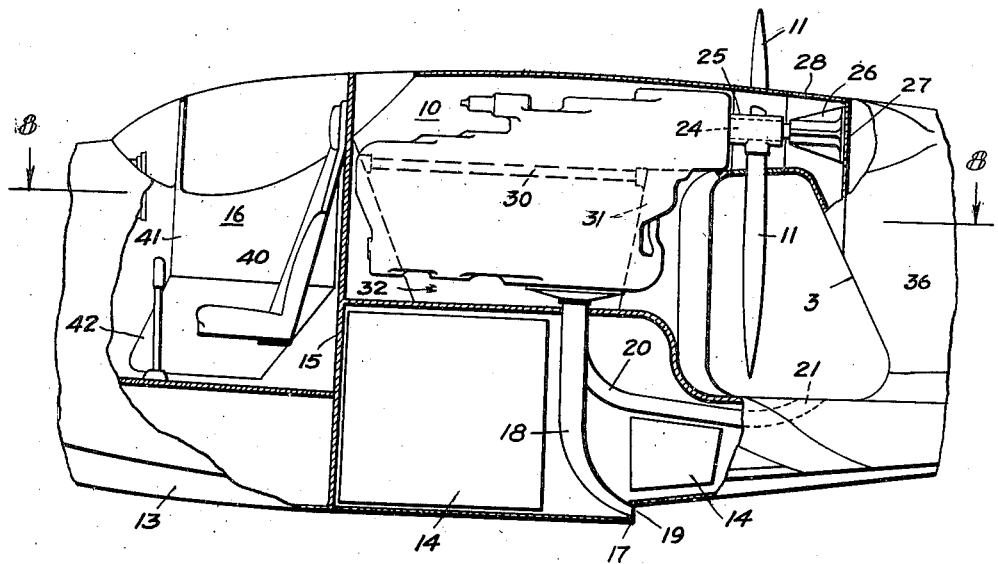
Fig. 7 is a fragmentary sectional view through the cockpit and engine compartment being on line 7—7 of Fig. 2.

The basic feature of this floating wing airplane 9 is its small frontal area and its low overall height heretofore associated solely with landplane arrangements. This is made possible by the location of the engine 10 and propeller 11 relative to the floatwing 12 and fuselage hull 13 which results in a submerged engine installation with the wing 12 providing spray and water protection for the propeller 11 during the take-off, landing or taxiing. Consequently, a floatwing seaplane or amphibian embodying these features approaches landplane aerodynamic cleanness and performance and is far superior to the conventional seaplane. The floatwing principle eliminates the use of auxiliary wing floats.

The arrangement shown enables the protected fuel tanks 14 to be located directly under the engine, resulting in shorter lines, less bullet-proofing for the lines, shorter controls and decreased weight as well as providing inherent pilot-protection against gun-fire. The bulkhead 15 acts as a firewall, provides fume-tightness for the cockpit 16, and can be soundproofed if desired.

The engine location relative to a step 17 makes possible exhausting through the rear of the step 17 as shown by the exhaust pipe 18 and the exhaust ports 19. This provides, (1) jet propulsion effect, (2) step ventilation during take-off, and (3) the elimination of aerodynamic discontinuity in flight due to the step 17. Although during water operations the exhaust ports 19 are under water, the maximum static back-pressure is only one inch of mercury. A pilot-controlled (or an automatic) auxiliary exhaust pipe 20 and port 21 can be provided that opens into the atmosphere well above the water line, cutting out the under-water ports 19 for starting or taxiing.

The side loads on the vertical fin 22 are resisted by the relatively wide base 23 of the fin 22. Fore and aft loads, due to bending, are resisted by means of an axial structural connection 24 through the hollow propeller shaft 25 and by means of the base connections 23 of the fin 22 and hull 13. This structural connection 24 fastens to the fitting 26 which is mounted on a vibration absorbing base 27 that can resist load only in the fore and aft direction. The propeller shaft 25 does not bear on the structural connection 24 but rotates freely around it, the propeller shaft 25 being held in the engine 10 in the conventional manner. The propeller 11 is easily removed by disconnecting and removing the fairing 28 and fitting 26, and sliding the propeller 11 aft off its shaft 25. The engine 10 is very simply mounted on bearers 30 running from the top of bulkhead 15 to a pedestal 31. Access panels 32 allow the engine 10 to be almost completely uncovered for servicing.

Air for cooling the engine 10 enters through the retractable scoops 33 and exits through the port 34 past the adjustable flaps 35 which are hinged at their center-lines, controlling the velocity of the cooling air flowing into the propeller disc 11. This reduces the drag due to the relative bluntness of the engine housing or fairing, and increases the propulsive efficiency, as a propeller operating in the wake of a body in a stream of reduced energy is theoretically more efficient than one operating in a free stream. The surface at 36 of fin 22 has a suitable leading edge 37 to further reduce the drag at this region. With a liquid cooled engine installation, radiators may be placed at the leading edge 37 of fin surface 36 through which edge 37 the cooling air would enter and exit through a slit 38 further aft along each side of the fin surface 36. This arrangement results in an unusually clean and efficient cooling installation.

The arrangement affords a pilot position 40 well forward of the wing 12. This offers unexcelled vision, not only over the leading edge 39 of the wing 12, but actually provides vision in an aft direction under the leading edge 39. Proper design of the nose contours results in extremely good vision in all forward directions and over the side of the hull 13. The location 40 of the pilot also offers safe emergency exit that eliminates the usual objection to the pusher type airplane. By means of the entrance door 41 and the removable emergency panels 42 the pilot may literally step out of the cockpit 16 in front of the leading edge 39 of the wing 12 and drop beneath the leading edge 39, well clear of the propeller 11 or tail surfaces, as he is protected by the wing 12 and fillets.

The armament is located in the nose, high enough to be satisfactorily clear of the water and is accessible to the pilot in flight, enabling hand-charging or manipulation in case of gun jams. The guns 43, being in the cockpit compartment 16, require no additional heating. The access panels 44 allow ample space for servicing. The empty cases and links drop into the hinged containers 45 which may be pulled open as shown at 46 for emptying, after ammunition feed boxes 47 have been removed.

The entire arrangement comprises a grouping of all of the heavy elements very close to the center of gravity. This affords an inherently low moment of inertia about all axes, resulting in unsurpassed controllability and maneuverability.

The fin and rudder combination 50 as it is directly aft of the propeller disc 11 is exceptionally effective and eliminates the use of a water rudder.

The design is especially suited for the incorporation of retractable tricycle land-type alighting gear 51 at a very low weight cost due to the short lengths of struts 52 required and the distribution of primary structure.

Other modifications and changes in the number and arrangement of the parts may be made by those skilled in the art without departing from the nature of this invention, within the scope of what is hereinafter claimed.

The invention herein described and claimed may be manufactured and used by or for the Government of the United States of America for governmental purposes without the payment of any royalties thereon or therefor.

What is claimed is:

1. A pusher type airplane comprising a fuselage, a propeller gap formed in said fuselage, a propeller extending into said gap with its axis of rotation adjacent the top of said gap, a pair of wings extending oppositely from said fuselage in low-wing position, the trailing edges of said wings extending below said propeller to provide a spray shield, an engine within said fuselage located above the trailing edges of said wings and below the propeller axis, air scoops in opposite sides of said fuselage directing cooling air to said engine, and means for controlling the discharge of said cooling air to said propeller gap.

2. A pusher type airplane comprising a fuselage, a pair of wings extending oppositely from said fuselage in low-wing position, an engine compartment in said fuselage, an engine mounted in said compartment, and a pusher propeller mounted aft of said engine compartment with its axis of rotation adjacent the top of said fuselage and substantially above the trailing edge of said wings, said fuselage including a vertical fin aft of said propeller, a structural connection between said fin and said engine compartment, a fitting detachably connected to said structural connection and said vertical fin and a hollow shaft for said propeller, removably mounted over said structural connection, thereby providing a propeller disc area in said fuselage between said engine compartment and said vertical fin.

3. A pusher type airplane comprising a fuselage, a pair of wings extending oppositely from said fuselage in low-wing position, an engine compartment in said fuselage, an engine mounted in said compartment, and a pusher propeller mounted aft of said engine compartment with its axis of rotation adjacent the top of said fuselage, above said engine and substantially above the trailing edge of said wings, said fuselage including a vertical fin aft of said propeller, a structural connection between said fin and said engine compartment, a fitting detachably connected to said structural connection and said vertical fin and a hollow shaft for said propeller, removably mounted over said structural connection, thereby providing a propeller disc area in said fuselage between said engine compartment and said vertical fin, and means to direct air through said engine compartment to that portion of said propeller disc area, immediately rear of said fuselage.

4. A pusher type airplane comprising a fuselage, a pair of wings extending oppositely from said fuselage in low-wing position, a fuselage tank compartment in said fuselage substantially aligned between said wings, an engine compartment in said fuselage directly above said fuselage tank compartment, an engine mounted in said compartment and a pusher propeller mounted aft of said engine compartment with its axis of rotation adjacent the top of said fuselage, above said engine, and substantially above the trailing edge of said wings, said fuselage including a vertical fin aft of said propeller, a structural connection between said fin and said engine compartment, a fitting detachably connected to said structural connection and said vertical fin, and a hollow shaft for said propeller, removably mounted on said structural connection, thereby providing a propeller disc area in said fuselage between said engine compartment and said vertical fin, and means to direct air through said engine compartment to said propeller disc area, said air directing means comprising retractable scoops opening forwardly on opposite sides of said engine compartment and a port having adjustable flaps aft of said engine compartment.

5. A pusher type airplane comprising a fuselage, a pair of wings extending oppositely from said fuselage in low-wing position, a fuselage tank compartment in said fuselage substantially aligned between said wings, an engine compartment in said fuselage directly above said fuselage tank compartment, an engine mounted in said compartment, pusher propeller mounted aft of said engine compartment with its axis of rotation adjacent the top of said fuselage, above said engine and substantially above the trailing edge of said wings, said fuselage including a vertical fin aft of said propeller, a structural connection between said fin and said engine compartment a fitting detachably connected to said structural connection and said vertical fin, and a hollow shaft for said propeller, removably mounted on said structural connection, thereby providing a propeller disc area in said fuselage between said engine compartment and said vertical fin, means to direct air through said engine compartment to said propeller disc area, said air directing means comprising retractable scoops opening forwardly on opposite sides of said engine compartment and a port having adjustable flaps aft of said engine compartment and engine radiator means located in the surfaces of said fin aft of said propeller disc area, said fin being provided with air discharge slits from said radiators.

6. A low-wing aircraft comprising a fuselage hull, a vertical fin integral with said hull forming in part an empennage, a propeller gap between said fuselage and said vertical fin, a propeller extending into said gap with its axis of rotation adjacent the top of said gap, said vertical fin and empennage being located relatively near to said propeller and longitudinally aligned with said propeller axis, thereby eliminating the use of a water rudder, an engine mounted in said fuselage forward of said gap, below the axis of said propeller, means to direct cooling air over said engine through said fuselage to said propeller gap, and a pair of wings extending oppositely from said fuselage in low-wing position, the trailing edges thereof providing protection for said propellers against water spray when the aircraft is operated as a seaplane during the take-off, landing and taxiing.

7. An aircraft of the class described comprising a fuselage, a propeller gap formed in said fuselage, said fuselage including a vertical fin aft of said gap, said vertical fin forming in part an empennage, a propeller extending into said gap with its axis of rotation adjacent the top of said gap, said vertical fin and empennage being aligned vertically and horizontally with the axis of said propeller, a pair of wings extending oppositely from said fuselage in low-wing position, an engine mounted within said fuselage forward of said gap and below the propeller axis, means located on opposite sides of said fuselage to direct cooling air over said engine through said fuselage to that portion of said gap immediately rear of said fuselage, said air directing means comprising adjustable scoops opening forwardly on opposite sides of said fuselage and a port having adjustable flaps formed in the rear wall of said fuselage for controlling the velocity of cooling air flowing into said gap, thereby reducing the drag caused by the relative bluntness of said fuselage and increasing the effectiveness of the fin.

8. A low-wing aircraft comprising a fuselage having a propeller gap formed therein, that portion of said fuselage rear of said gap forming a vertical fin, a structural connection between said vertical fin and said fuselage, the forward end of said connection being fixed within said fuselage, a fitting detachably connected to the rear end of said structural connection and said vertical fin, a fairing plate housing said fitting and detachably secured to said vertical fin, and a hollow shaft for said propeller, removably mounted over said structural connection, thereby facilitating removal and assembly of the propeller as a unit.

9. A low-wing seaplane comprising a fuselage hull, a propeller gap formed in said hull, a pair of wings extending from said hull in a low-wing position, a pusher propeller extending into said gap with its axis of rotation adjacent the top of said hull, an engine supported within said hull below the propeller axis and symmetrically disposed about the plane extending through the longitudinal axis of the seaplane and the said propeller axis, the said propeller operable by said engine and located immediately ahead of and above the trailing edge of said wings, retractable air scoops in opposite sides of said hull adapted to direct cooling air to said engine and means for discharging said cooling air to that portion of the propeller gap immediately to the rear of the fuselage.

10. A low-wing amphibian plane comprising a fuselage, a propeller gap formed in said fuselage, a propeller mounted on a hollow shaft extending into said gap, the said shaft positioned adjacent the top of the said gap, a fairing fitting detachably secured to the fuselage structure provided with a shaft extending into the said hollow shaft adapted to stiffen the fuselage structure against vertical bending moments, a pair of wings extending from the fuselage in low-wing position adapted to provide lateral stability to the plane without the use of auxiliary floats when floating on water, the said propeller positioned relatively close to said wings and forward of the trailing edge thereof and an engine and fuel tanks supported within the fuselage below the hollow shaft of the propeller, forward thereof, thereby producing a fuselage of relatively low height and an inherently low moment of inertia of all elements about all axes with resulting greater ease of controllability and increased maneuverability of the plane.

THEODORE C. BENNETT.
MARK MORTON.
FREDERICK M. GLOECKLER.

(References on following page)

REFERENCES CITED

The following references are of record in the file of this patent:

UNITED STATES PATENTS

| Number | Name | Date |
|---|---|---|
| D. 134,458 | Johnson | Dec. 1, 1942 |
| 1,165,770 | Gallaudet | Dec. 28, 1915 |
| 1,228,382 | Curtiss | May 29, 1917 |
| 1,262,660 | Gallaudet | Apr. 16, 1918 |
| 1,295,084 | Curtiss | Feb. 18, 1919 |
| 1,313,252 | Brooke | Aug. 19, 1919 |
| 1,386,493 | Guyot | Aug. 2, 1921 |
| 1,394,630 | Loening | Oct. 25, 1921 |
| 1,427,872 | Verville | Sept. 5, 1922 |
| 2,005,728 | Burgess | June 25, 1935 |
| 2,070,086 | Martin | Feb. 9, 1937 |
| 2,087,832 | Birkigt | July 20, 1937 |

FOREIGN PATENTS

| Number | Country | Date |
|---|---|---|
| 717,054 | France | Oct. 13, 1931 |